United States Patent
Kim et al.

(10) Patent No.: US 12,159,118 B2
(45) Date of Patent: *Dec. 3, 2024

(54) ARCHITECTURE FOR GENERATING QA PAIRS FROM CONTEXTS

(71) Applicants: 42Maru Inc., Seoul (KR); Korea Advanced Institute of Science and Technology, Daejon (KR)

(72) Inventors: Dong Hwan Kim, Seoul (KR); Sung Ju Hwang, Seoul (KR); Seanie Lee, Gyeonggi-do (KR); Dong Bok Lee, Seoul (KR); Woo Tae Jeong, Gyeonggi-do (KR); Han Su Kim, Gyeonggi-do (KR); You Kyung Kwon, Seoul (KR); Hyun Ok Kim, Gyeonggi-do (KR)

(73) Assignees: 42 Maru Inc., Daejeon (KR); Korea Advanced Institute of Science and Technology, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/544,209

(22) Filed: Dec. 18, 2023

(65) Prior Publication Data
US 2024/0143940 A1 May 2, 2024

Related U.S. Application Data

(63) Continuation of application No. 17/096,767, filed on Nov. 12, 2020, now Pat. No. 11,886,233.

(30) Foreign Application Priority Data
Nov. 10, 2020 (KR) .................. 10-2020-0149364

(51) Int. Cl.
*G06F 40/35* (2020.01)
*G06N 3/045* (2023.01)
(Continued)

(52) U.S. Cl.
CPC ............ *G06F 40/35* (2020.01); *G06N 3/045* (2023.01); *G06N 3/08* (2013.01); *G06N 5/04* (2013.01)

(58) Field of Classification Search
CPC ........ G06F 40/35; G06N 3/0454; G06N 3/08; G06N 5/04
See application file for complete search history.

(56) References Cited

U.S. PATENT DOCUMENTS

| | | | |
|---|---|---|---|
| 2020/0034722 A1* | 1/2020 | Oh | G06N 3/084 |
| 2020/0042819 A1* | 2/2020 | Zhang | G06N 3/006 |
| 2021/0342551 A1* | 11/2021 | Yang | G06N 3/08 |

* cited by examiner

*Primary Examiner* — Bhavesh M Mehta
*Assistant Examiner* — Edward Tracy, Jr.
(74) *Attorney, Agent, or Firm* — Sughrue Mion, PLLC

(57) ABSTRACT

The present invention relates to a context-based QA generation architecture, and an object of the present invention is to generate diverse QA pairs from a single context. To achieve the object, the present invention includes a latent variable generating network including at least one encoder and an artificial neural network (Multi-Layer Perceptron: MLP) and configured to train the artificial neural network using a first context, a first question, and a first answer, and generate a second question latent variable and a second answer latent variable by applying the trained artificial neural network to a second context, an answer generating network configured to generate a second answer by decoding the second answer latent variable, and a question generating network configured to generate a second question based on a second context and the second answer.

15 Claims, 6 Drawing Sheets

(51) Int. Cl.
*G06N 3/08* (2023.01)
*G06N 5/04* (2023.01)

| Method | QAE (↑) | R-QAE (↓) |
|---|---|---|
| SQuAD (EM/F1) | | |
| Harvesting-QG | 55.11/66.40 | 64.77/78.85 |
| Maxout-QG | 56.08/67.50 | 62.49/78.24 |
| Semantic-QG | 60.49/71.81 | 74.23/88.54 |
| HCVAE | 69.46/80.79 | 37.57/61.24 |
| Info-HCVAE | 71.18/81.51 | 38.80/60.73 |
| Natural Questions (EM/F1) | | |
| Harvesting-QG | 27.91/41.23 | 49.89/70.01 |
| Maxout-QG | 30.98/44.96 | 49.96/70.03 |
| Semantic-QG | 30.59/45.29 | 58.42/79.23 |
| HCVAE | 31.45/46.77 | 32.78/55.12 |
| Info-HCVAE | 37.18/51.46 | 29.39/53.04 |
| TriviaQA (EM/F1) | | |
| Harvesting-QG | 21.32/30.21 | 29.75/47.73 |
| Maxout-QG | 24.58/34.32 | 31.56/49.92 |
| Semantic-QG | 27.54/38.25 | 37.45/58.15 |
| HCVAE | 30.20/40.88 | 34.41/48.16 |
| Info-HCVAE | 35.45/44.11 | 21.65/37.65 |

| Harvest-QG | Maxout-QG | Semantic-QG | HCVAE | Info-HCVAE |
|---|---|---|---|---|
| 111.74 | 114.58 | 112.94 | 113.89 | 117.41 |

| Method | QAE (↑) | R-QAE (↓) |
|---|---|---|
| Baseline | 56.08/67.50 | 62.49/78.24 |
| +Q-latent | 58.66/70.54 | 40.00/62.02 |
| +A-latent | 69.46/80.79 | 37.57/61.24 |
| +InfoMax | 71.18/81.51 | 38.80/60.73 |

FIG. 6

| Method | Diversity | Consistency | Overall |
|---|---|---|---|
| Baseline | 26% | 34% | 30% |
| Ours | 47% | 50% | 52% |
| Tie | 27% | 16% | 18% |

FIG. 7

| | |
|---|---|
| Paragraph | The scotland act 1998 which was passed by and given royal assent by queen Elizabeth ii on 19 november 1998, governs functions and role of the scottish parliament and delimits its legislative competence ... |
| GT | what act sets forth the functions of the scottish parliament? |
| O-1 | which act was passed in 1998? |
| O-2 | which act governs role of the scottish parliament? |
| O-3 | which act was passed by queen Elizabeth ii? |
| O-4 | which act gave the scottish parliament the responsibility to determine its legislative policy? |

FIG. 8

| | |
|---|---|
| | Paragraph ... Atop the main building's gold dome is a golden statue of the virgin mary. ... Next to the main building is the basilica of the sacred heart. Immediately behind the basilica is the grotto, ... a marian place of prayer and reflection. ... At the end of the main drive ..., is a simple, modern stone statue of mary. |
| Ori1 | Q what is the grotto at notre dame?<br>A a marian place of prayer and reflection |
| Gen | Q *where is the grotto at?*<br>A *a marian place of prayer and reflection* |
| | Q *what place is behind the basilica of prayer?*<br>A *grotto* |
| | Q *what is next to the main building at notre dame?*<br>A *the basilica of the sacred heart* |
| | Q *what is at the end of the main drive?*<br>A *stone statue of mary* |
| Ori2 | Q what sits on top of the main building at notre dame?<br>A a golden statue of the virgin mary |

FIG. 9

| Data | EM | F1 |
|---|---|---|
| SQuAD | 80.25 | 88.23 |
| Semantic-QG (baseline) | | |
| +S×10 | 81.20 (+0.95) | 88.36 (+0.13) |
| +H×100% | 81.03 (+0.78) | 88.79 (+0.56) |
| +S×10 + H×100% | 81.44 (+1.19) | 88.72 (+0.49) |
| Info-HCVAE (ours) | | |
| +S×10 | 82.09 (+1.84) | 89.11 (+0.88) |
| +H×10% | 81.37 (+1.12) | 88.85 (+0.62) |
| +H×20% | 81.68 (+1.43) | 89.06 (+0.93) |
| +H×30% | 81.76 (+1.51) | 89.12 (+0.89) |
| +H×50% | 82.17 (+1.92) | 89.38 (+1.15) |
| +H×100% | 82.37 (+2.12) | 89.63 (+1.40) |
| +S×10 + H×100% | 82.19 (+1.94) | 89.84 (+1.59) |

FIG. 10

| Data | EM | F1 |
|---|---|---|
| Natural Questions | | |
| SQuAD | 42.77 | 57.29 |
| +N×1 | 46.70 (+3.94) | 61.08 (+3.79) |
| +N×2 | 46.95 (+4.19) | 61.34 (+4.05) |
| +N×3 | 47.73 (+4.96) | 61.98 (+4.69) |
| +N×5 | 48.19 (+5.42) | 62.21 (+4.92) |
| +N×10 | 48.44 (+5.67) | 62.69 (+5.40) |
| NQ | 61.65 | 73.91 |
| TriviaQA | | |
| SQuAD | 48.96 | 57.98 |
| +T×1 | 49.65 (+0.69) | 59.13 (+1.21) |
| +T×2 | 50.01 (+1.05) | 59.08 (+1.10) |
| +T×3 | 49.71 (+0.75) | 59.49 (+1.51) |
| +T×5 | 50.14 (+1.18) | 59.21 (+1.23) |
| +T×10 | 49.65 (+0.69) | 59.20 (+1.22) |
| Trivia | 64.55 | 70.42 |

ARCHITECTURE FOR GENERATING QA PAIRS FROM CONTEXTS

CROSS-REFERENCE TO RELATED APPLICATIONS

This application is a continuation of U.S. patent application Ser. No. 17/096,767, filed on Nov. 12, 2020, entitled "ARCHITECTURE FOR GENERATING QA PAIRS FROM CONTEXTS", which application claims priority to and the benefit of Korean Patent Application No. 10-2020-0149364, filed Nov. 10, 2020, the disclosures of which are incorporated herein by reference in their entirety. Any disclaimer that may have occurred during the prosecution of the above-referenced applications is hereby expressly rescinded, and reconsideration of all relevant art is respectfully requested.

BACKGROUND OF THE INVENTION

Field of the Invention

The present invention relates to an architecture that generates a question-answer pair, that is, a QA pair from a certain context.

Description of the Related Art

QA (question answering) is one of the most fundamental tasks for natural language understanding. Due to the increased complexity of deep neural networks and the transfer of knowledge from the language models pre-trained on large-scale corpora, state-of-the-art QA models have achieved human-level performance. In order to deploy the state-of-the-art QA model to an actual application, it is necessary to construct and train high-quality datasets with large volumes of QA pairs; however, this will be costly, requiring a massive amount of human efforts and time.

SUMMARY OF THE INVENTION

The present invention is to solve the above-described problem, and an object of the present invention is to generate a model that generates QA pairs from an certain context, and use question-answer data generated through the model to train a QA model that estimates an answer to a question.

Another object of the present invention is to generate diverse QA pairs from a single context by using a new probabilistic deep model.

In addition, still another object of the present invention is to effectively enhance consistency between generated QA pairs by maximizing mutual information between questions and answers.

To achieve the object, the present invention includes a latent variable generating network including at least one encoder and an artificial neural network (Multi-Layer Perceptron: MLP) and configured to train the artificial neural network using a first context, a first question, and a first answer, and generate a second question latent variable and a second answer latent variable by applying the trained artificial neural network to a second context, an answer generating network configured to generate a second answer by decoding the second answer latent variable, and a question generating network configured to generate a second question based on a second context and the second answer.

BRIEF DESCRIPTION OF THE DRAWINGS

FIG. 6 is a table showing human evaluation results in terms of quality, diversity, and consistency of QA according to HCVAE performance verification experiments according to an embodiment of the present invention.

FIG. 7 is a view showing an example of 1:N mapping according to HCVAE performance verification experiments according to an embodiment of the present invention.

FIG. 8 is a view showing the potential expansion of QA pairs according to HCVAE performance verification experiments according to an embodiment of the present invention.

FIG. 9 is a table showing EM and F1 result values by unsupervised QA according to HCVAE performance verification experiments according to an embodiment of the present invention.

FIG. 10 is a table showing the performance of unsupervised QA models of NQ and TriviaQA datasets according to HCVAE performance verification experiments according to an embodiment of the present invention.

DETAILED DESCRIPTION OF THE PREFERRED EMBODIMENTS

Figures 1, 2:
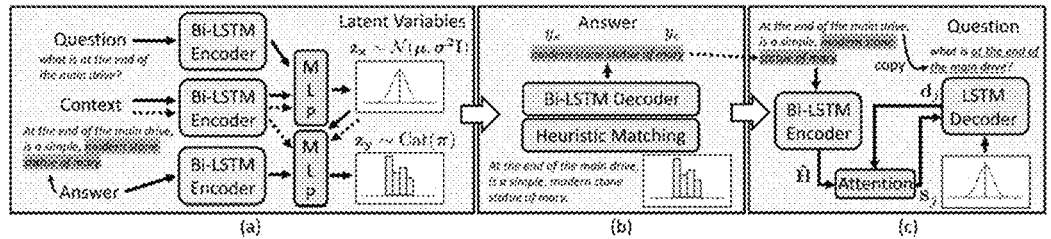
FIG. 1 is a diagram showing a configuration of a context-based QA generation architecture according to an embodiment of the present invention.
FIG. 2 is a table showing QAE and R-QAE values for each dataset according to HCVAE performance verification experiments according to an embodiment of the present invention.

The above-described objects, features, and advantages will be described in detail below with reference to the accompanying drawings, and accordingly, a person skilled in the art to which the present invention pertains can easily implement the technical spirit of the present invention. In describing the present invention, when it is determined that the detailed description of the known technology related to the present invention may unnecessarily obscure the gist of the present invention, the detailed description thereof will be omitted.

In the drawings, the same reference numerals are used to indicate the same or similar elements, and all combinations described in the specification and claims may be combined in any manner. Unless otherwise specified, it should be understood that the singular form may include more than one, and the singular form may also include the plural form.

The terminology used herein is for the purpose of describing particular embodiments only and is not intended to be limiting of example embodiments of the invention. As used herein, the singular forms are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," "including", "have" and/or "having," when used herein, specify the presence of stated features, integers, steps, operations, elements, and/or components, but do not preclude the presence or addition of one or more other features, integers, steps, operations, elements, components, and/or groups thereof. The steps, processes, and operations of the methods described herein should not be construed as necessarily performing their performance in the particular order discussed or illustrated, unless the order in which they are specifically performed is determined. It should also be understood that additional or alternative steps may be used.

In addition, each component may be implemented as a hardware processor, the above components may be integrated to be implemented as a single hardware processor, or the above components may be combined with each other to be implemented as a plurality of hardware processors.

Hereinafter, preferable embodiments of the present invention will be described in detail with reference to the accompanying drawings.

An architecture for generating QA pairs according to the present invention is an Hierarchical Conditional Variational Autoencoder (HCVAE) including a latent variable generating network that generates a latent variable corresponding to at least one of a context, a question, or an answer, a question generating network that generates a question, and an answer generating network that generates an answer, and the latent variable generating network may further include constraints in generating the latent variable. Hereinafter, for convenience of description, the question-and-answer generation architecture of the present invention is referred to as HCVAE.

HCVAE according to an embodiment of the present invention may generate an answer for a given context, and then generate a question about the answer and the context by sampling the answer generated in the question generating network. Generating an answer first from a given context and then generating a question is to prevent generation of a question that is not related to the answer.

In this way, the HCVAE of the present invention may generate diverse QA pairs focusing on different parts of context for each time.

In addition, the HCVAE according to an embodiment of the present invention is semantically dependent on each other so that a question may coincide with a given answer in context, and thus, consistency between a question and an answer may be guaranteed. The HCVAE of the present invention may ensure consistency by maximizing mutual information of a QA pair. In this case, the mutual information means data obtained by quantifying how dependent two variables of question and answer are. Through this, the present invention may generate diverse and consistent QA pairs even from a short context.

Hereinafter, the HCVAE for generating a question and an answer based on context according to an embodiment of the present invention will be described in detail. FIG. 1 is a diagram showing the configuration of an HCVAE according to an embodiment of the present invention, where (a) is a latent variable generating network, (b) is an answer generating network, and (c) is a question generating network.

Referring to (a) of FIG. 1, a latent variable generating network may include three Bi-LSTM encoders and two MLPs (Multi-Layer Perceptron).

The three Bi-LSTM encoders may be assigned to context, question, and answer for data processing thereof, respectively. The Bi-LSTM encoder assigned to the context may only perform encoding on the context.

The Bi-LSTM encoder may add an LSTM algorithm that processes data in the reverse direction to the LSTM algorithm and outputs a vector that connects the hidden states of the two LSTM algorithms, and may be used for embedding of a QA model. Bi-LSTM may learn all parameters at the same time in the process of minimizing loss to an output value and internalize the similarity between words and phrases into an input vector to improve performance, and the performance thereof may not be degraded even when a data length is long.

MLP is a feed-forward artificial neural network that generates a series of outputs from a series of inputs, and is characterized by including a layer of several input nodes connected by a graph indicated between an input layer and an output layer.

According to the present invention, the latent variable generating network, the question generating network, and the answer generating network may be trained so that a question and an answer are generated from context only. The present invention may train the latent variable generating network, the question generating network, and the answer generating network using training data received from a user, in which case the training data may include a first context, and a first question and a first answer which correspond to the first context and are labeled by the user.

The latent variable generating network may set the first context, the first question, and the first answer received from the user as input data of the Bi-LSTM encoders, respectively, and generate a first context vector, a first question vector, and a first answer vector for the first context, the first question, and the first answer through the Bi-LSTM encoders, respectively.

The latent variable generating network may generate a first parameter ($\mu'$) and a second parameter ($\sigma'$) by using the first context vector and the first question vector as input data of a first MLP. The first parameter and the second parameter may be used to generate a first question latent variable ($z_x$).

The latent variable generating network may generate a third parameter ($\pi'$) by using the first question latent variable and the first answer vector as input data of a second MLP. The third parameter may be used to generate a first answer latent variable ($z_y$).

The latent variable generating network may generate the first question latent variable ($z_x$) and the first answer latent variable ($z_y$) using output data of the first MLP and the second MLP.

Specifically, the latent variable generating network may generate the first question latent variable ($z_x \sim \mathcal{N}((\mu', \sigma'^2 I))$) by using the first parameter and the second parameter as parameters of an isotropic Gaussian distribution.

The latent variable generating network may generate the second answer latent variable ($z_y \sim \text{Cat}(\pi')$) by using the third parameter as a parameter of categorical distribution.

Question latent variable $z_x \sim p_\phi(z_x|x, c)$ and answer latent variable $z_y \sim p_\phi(z_y|z_x, y, c)$ are generated according to probability, and since differentiation is impossible, according to the present invention, the latent variable generating network may be trained to generate an appropriate first question latent variable $z_x$ and an appropriate first answer variable z y by using backpropagation.

This is to configure an HCVAE architecture according to an embodiment of the present invention to improve the similarity between the result of decoding the latent variable in the question generating network and the answer generating network, and the existing context, the question, and answer, which is the input data of the latent variable generating network, by giving constraints to the latent variable through distribution.

Moreover, the question generating network and the answer generating network may be trained based on the first question latent variable and the first answer latent variable in accordance with the conventional method, in which case the training process of the question generating network and the answer generating network follows the conventional method.

When training of the latent variable generating network, the question generating network, and the answer generating network is completed as in the above process, the HCVAE of the present invention may receive a second context from a user to generate diverse and consistent QA pairs. Specifically, the second context (c) received from the user may contain m tokens (c=($c_1$, ..., $c_m$)), and the HCVAE may generate QA pairs ((x, y)|x=($x_1$, ..., $x_n$), y=($y_1$, ..., $y_l$)) for the second question containing n tokens and its corresponding answer containing l token based on the second context.

When the tokens contained in the second context uses a binary token type ID of BERT, tokens of all contexts may be encoded as 0s except for m tokens that are part of the answer span encoded as 1s. Thereafter, a sequence of word token ID, token type ID, and position ID may be fed into the embedding layer.

In the present invention, when a context from which a QA pair can be sampled is given, p (x, y|c) may be generated based on the HCVAE to be described below for the purpose of processing the OAG task through the training process.

The HCVAE of the present invention may approximate p (x, y|c), which is a conditional distribution, by using a hierarchical conditional VAE (Variational Auto-Encoder) framework including a separate potential space for question and answer, that is, a generating network. This process may be completed through Equation 1. In Equation 1, $z_x$ and $z_y$ are latent variables for a question and an answer, and $p_\psi(z_x|c)$ and $p_\psi(z_y|z_x, c)$ are latent variables for a question and a answer following an isotropic Gaussian distribution and a categorical distribution.

$$p_\theta(x, y|c) = \int_{z_x} \sum_{z_y} p_\theta(x|z_x, y, c) p_\theta(y|z_x, y, c) \cdot p_\psi(z_y|z_x, c) p_\psi(z_x|c) dz_x \quad \text{[Equation 1]}$$

The HCVAE of the present invention may separate a question generating network and an answer generating network. The reason for that is that in the case of answers, the answer may exist within a finite span of the context modeled by the categorical distribution, but in the case of questions, unlimited questions can be generated from a single context.

In the present invention, by using the hierarchical structure of the question generating network and the answer generating network, the answer latent variable is enforced to be dependent on the question latent variable of $p_\psi(z_y|z_x, c)$, and reverse dependency may be achieved by sampling the question x~$p_\theta(x|z_x, y, c)$. Thereafter, Evidence Lower Bound (ELBO) may be maximized by using a variational posterior $q_\Phi(\cdot)$ as shown in Equation 2. In Equation 2, θ denotes a parameter of the question and answer generating networks, ϕ denotes a parameter of the posterior network of the latent variable generating network, and Ψ denotes a parameter of a prior network of the latent variable generating network.

$$\log p_\theta(x, y|c) \geq \mathbb{E}_{z_x \sim q_\phi}(z_x|x, c)[\log p_\theta(x|z_x, y, c)] + \quad \text{[Equation 2]}$$
$$\mathbb{E}_{z_y \sim q_\phi}(z_y|z_x, y, c)[\log p_\theta(y|z_y, c)] -$$
$$D_{KL}[q_\phi(z_y|z_x, y, c) \| p_\psi(z_y|z_x, c)] -$$
$$D_{KL}[q_\phi(z_x|x, c) \| p_\psi(z_x|c)] =: \mathcal{L}_{HCVAE}$$

Hereinafter, an operation mechanism according to the architecture of HCVAE will be described in more detail.

The latent variable generating network may generate a second context vector through the Bi-LSTM encoder by setting the second context as input data of a Bi-LSTM encoder assigned to the context. The Bi-LSTM encoder assigned to the context may generate the second context vector and then set the second context vector as input data of the first and second MLPs.

The first MLP may generate a second question latent variable ($z_x \sim p_\psi(z_x|c)$) based on the second context vector and transmit the second question latent variable to the second MLP. The second MLP may generate a second answer latent variable ($z_y \sim p_\psi(z_y|z_x, c)$) based on the second context vector and the second question latent variable. The generated second question latent variable may be matched according to a Gaussian distribution ($z_x \sim \mathcal{N}(\mu, \sigma^2 I)$), and the second answer latent variable may be matched according to a categorical distribution ($z_y \sim \text{Cat}(\pi)$).

The latent variable generating network may transmit the second answer latent variable mapped according to the distribution to the answer generating network ((b) of FIG. 1).

The answer generating network may include a Bi-LSTM decoder and decode the second answer latent variable received from the latent variable generating network. The answer generating network may generate a second answer by decoding the second answer latent variable.

Specifically, the answer generating network may generate a second answer by predicting the start and end points of a correct answer span based on the context information of the second context and the second answer latent variable. More specifically, the answer generating network may divide $p_\theta(y|z_y, c)$ into $p_\theta(y_s|z_y, c)$, which is the start point of the answer span, and $p_\theta(y_e|z_y, c)$, which is the end point of the answer span and then predict $y_s$ and $y_e$ to generate a second answer.

In generating the second answer, the answer generating network may generate more correct answer by using the second context and the second answer latent variable by applying a heuristic matching algorithm.

The answer generating network may transmit the generated second answer to the question generating network ((c) of FIG. 1).

The question generating network may include a Bi-LSTM encoder and an LSTM decoder by selecting a structure mainly used conventionally.

The question generating network may generate a third answer vector and a third context vector by encoding the second answer and the second context as word embedding through a Bi-LSTM encoder based on a pre-trained BERT.

The LSTM decoder includes two layers that convert the third answer vector and the third context vector into initial states, and the LSTM decoder may generate the second question based on the third answer vector and the third context vector generated by the Bi-LSTM encoder of the question generating network.

Furthermore, the question generating network may generate a question by minimizing loss occurring in the decoding process by using an attention mechanism.

According to the above process, the second question and the second answer for the second context generated by the HCVAE of the present invention may be used as a training dataset for training the QA model.

Furthermore, as one of the most important tasks of the QAG model is to strengthen the consistency between generated questions and answers, questions and answers need to be semantically consistent in order to predict answers through questions and contexts. However, since neural QG or QAG models do not contain mechanisms to enhance consistency, questions that are completely independent of contexts and answers may be frequently generated.

Accordingly, assuming that an answerable QA pair have high mutual information (MI), the HCVAE of the present invention solves the above problem by maximizing the mutual information of the generated QA pair. In this case, since exact calculation of mutual information is somewhat difficult, a neural estimation value may be used as shown in Equation 3. In Equation 3, $E_p$ and $E_N$ denote expected values for positive and negative examples.

In mini-batch, QA pairs may be shuffled to generate negative examples so that questions and answers are randomly connected, and the g(·) function works like a binary classifier that determines whether or not a QA pair comes from a common distribution, so that the g(·) function may effectively achieve QAG goal related to consistency, as shown in Equation 4. In Equation 4, $\bar{x}$ and $\bar{y}$ denote summary expressions of a question and an answer, and the final goal of Info-HCVAE combined with ELBO is shown in Equation 5. In Equation 5, $\lambda$ may always have a value of 1.

$$MI(X; Y) \geq \mathbb{E}_{x,y \sim \mathbb{P}}[\log g(x, y)] + \frac{1}{2}\mathbb{E}_{\tilde{x},y \sim \mathbb{N}}[\log(1 - g(\tilde{x}, y))] + \frac{1}{2}\mathbb{E}_{x,\tilde{y} \sim \mathbb{N}}[\log(1 - g(x, \tilde{y}))] =: \mathcal{L}_{Info}$$
[Equation 3]

$$g(x, y) = \text{sigmoid}(\bar{x}^T W \bar{y}), \bar{x} = \frac{1}{N}\sum_i \hat{d}_i, \bar{y} = \frac{1}{L}\sum_j \hat{h}_j$$
[Equation 4]

$$\max \mathcal{L}_{HCVAE} + \lambda \mathcal{L}_{Info}$$
[Equation 5]

An experiment was performed to verify HCVAE according to an embodiment of the present invention. Hereinafter, experimental conditions for verifying HCVAE will be described.

DataSet

Four datasets were utilized to verify the HCVE of the present invention.

Stanford Question Answering Dataset v1.1 (SQuAD): The SQuAD dataset is a dataset including questions obtained from crowdsourcing on Wikipedia article data, where answers to all questions are the text of phases.

Natural Questions (NQ): The NQ dataset includes realistic questions. Specifically, the NQ dataset uses Wikipedia articles as context, and includes various questions ranging from user queries to search engines. The present invention converts data provided through an MRQA sharing operation into QA data and uses the QA data as an experimental dataset.

TriviaQA: TriviaQA is a dataset including QA evidence triples, TriviaQA pairs and context are uploaded from the user, and the present invention adopts and uses only QA pairs whose answers depend on the context.

HarvestingQA: HarvestingQA is a dataset containing top-ranking 10K Wikipedia articles and 1M synthetic QA pairs, and is used for unsupervised training.

Experimental Setups

In the present invention, after setting hyperparameters using BERT (d=768) as the QA model, the hidden dimensionality for the latent variable generating network, the question generating network, and the answer generating network is set to 300, and dimensionality of the encoder and the decoder of the question generating network are set to 450 and 900. In addition, the dimensionality of $z_x$ is set to 50, and $z_y$ is defined to be a set of 10-way categorical variables ($z_y = \{z_1, \ldots, z_{20}\}$). Also, epoch is set to 2 in training the deep model.

In the present invention, to train the QA model and Info-HCVAE, an Adam optimizer with a batch size of 32 and an initial training rate of $5 \times 10^{-5}$ and $10^{-3}$ may be used. In the case of unsupervised training, the present invention may fine-tune a dataset after pre-training BERT in advance according to 2 epochs. Also, the Kullback-Leibler divergence (KLD) of question and answer is multiplied by 0.1 to prevent post-collapse.

Reference Model

To verify the performance of the HCVAE of the present invention, two variants were experimented against several reference models. For the reference model, the same answer span extracted from the answer generating network is used.

1. Harvest-QG: An attention-based neural QG model with a neural answer extraction system.
2. Maxout-QG: A neural QG model based on maxout copy mechanism with a gated self-attention, which uses BERT as the word embedding.
3. Semantic-QG: A neural QG model based on Maxout-QG with semantic-enhanced reinforcement learning.
4. HCVAE: HCVAE model of the present invention without the InfoMax normalizer
5. Info-HCVAE: Full model of the present invention with the InfoMax normalizer.

Quantitative Analysis

A QA-based Evaluation (QAE) metric is used to measure the performance of the QA model of the present invention. The QAE metric may measure the quality by training the QA model using synthetic data and then evaluating the QA model with labeled test data. However, the QAE metric only measures how well the distribution of the synthetic QA pairs matches the distribution of the GT QA pairs, and does not consider the diversity of the QA pairs.

Therefore, the generated QA pairs may be evaluated using R-QAE (Reverse QA-based Evaluation), which verifies the accuracy of the QA model including the human-annotated QA pairs. When the synthetic data covers a larger distribution than the training data containing human-annotated QA pairs, the R-QAE value may be measured low. However, a low R-QAE is only meaningful when the QAE is high enough since trivially invalid questions may also yield low R-QAE.

Results

HCVAE and Info-HCVAE were compared to reference models of SQuAD, NQ and TriviaQA. 10% of the Wikipedia paragraphs from the HarvestingQA dataset are used for the evaluation of QA pairs. Referring to FIG. 2, it can be seen that HCVAE and Info-HCVAE both significantly outperforms all reference models including SQuAD, NQ, and TriviaQA datasets in QAE, which shows that the HCVAE of the present invention has generated both high-quality and diverse QA pairs from the given context. It can also be seen that Info-HCVAE largely outperforms HCVAE, which demonstrates the effectiveness of our InfoMax normalizer for enforcing QA-pair consistency.

Figures 3, 4, 5:
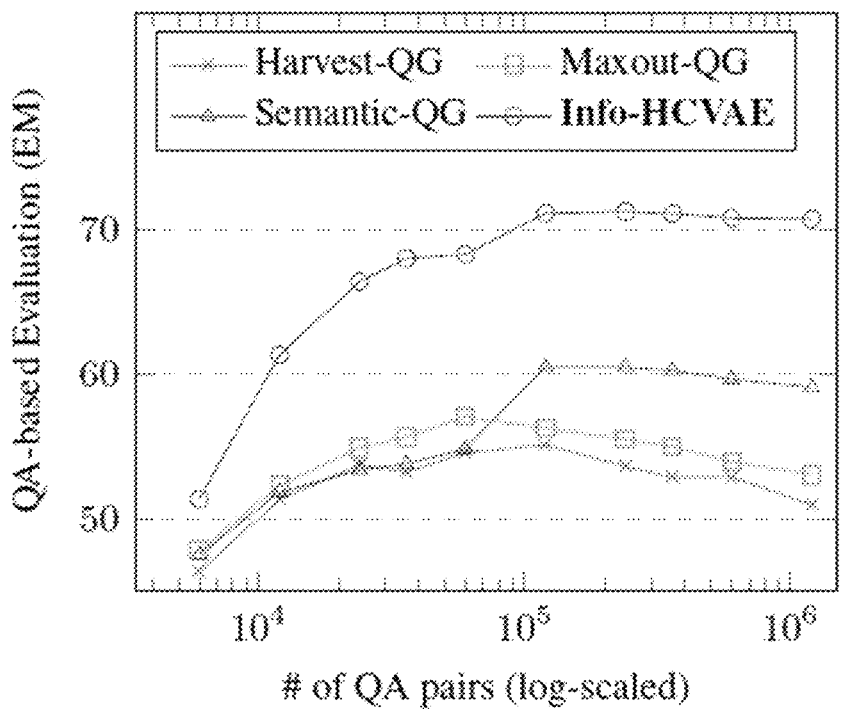
FIG. 3 is a graph showing accuracy of a function for generating QA pairs for a SQuAD dataset according to HCVAE performance verification experiments according to an embodiment of the present invention.
FIG. 4 is a table showing results of measuring mutual information according to HCVAE performance verification experiments according to an embodiment of the present invention.
FIG. 5 is a table showing QAE and R-QAE values when a latent variable is added to a reference model using a SQuAD dataset according to HCVAE performance verification experiments according to an embodiment of the present invention.

FIG. 3 is a graph showing the accuracy of HCVAE according to the number of QA pairs, and Info-HCVAE shows a high margin by using a smaller number of QA pairs. For example, Info-HCVAE achieved 61.38 points using 12K QA pairs, outperforming Semantic-QG that use 10 times larger number of QA pairs. Referring to FIG. 4, it can be seen that the score of $\bar{x}^T W \bar{y}$ is used as an approximate estimation of the mutual information (MI) between the QA pairs generated by each reference model, and the consistency of the generated QA pairs is excellent because Info-HCVAE has the largest value in the mutual information estimation.

Ablation Experiment

In addition, an additional Ablation experiment was performed to confirm the effect of each model component. First, the effect of modeling was confirmed for each of an Seq2Seq model without any latent variables, a model in which the +Q latent variable is added, and a model in which the +A latent variable is added. Referring to FIG. 5, it can be seen that latent variables are essential for improving both the quality and diversity of the generated QA pairs. It can also be seen that the consistency of QA pairs generated from the model in which InfoMAX is added is further improved.

Qualitative Analysis

For the qualitative analysis, first, evaluation of QA pairs generated from Info-HCVAE and Maxout-QG was performed on 100 paragraphs randomly selected by a human. Specifically, 20 humans have evaluated two sets of randomly selected QA pairs (1 set=2 to 5 QA pairs) in terms of overall quality, diversity and consistency between QA pairs and a context. Referring to FIG. 6, it can be seen that QA pairs generated by Info-HCVAE is more diverse and consistent when compared with the QA pairs generated by an existing model.

1:N QG

It is possible to verify that the 1 to N mapping problem for question generation can be effectively tackled by analyzing questions given from a context and answers contained in the SQUAD validation set. Specifically, the question potential variables are sampled several times from $p_\psi(z_x|c)$ among the latent variable generating networks, and then fed to the question generating network $p_\theta(x|z_x, y, c)$ with the answer. Referring to FIG. 7, it can be seen that when an answer is given, the Info-HCVAE generates diverse and semantically consistent questions.

Latent Space Interpolation

To examine whether the Info-HCVAE learns whether QA pair generating network is meaningful, the QA pairs are analyzed by interpolating between two latent codes in the SQuAD training dataset. First, the $z_x$ of the two QA pairs is encoded in $q_\varphi(z_x|x, c)$ of the latent variable generating network, and thereafter, $z_y$ is sampled from the interpolated $z_x$ using $p_\psi(z_y|z_x, c)$ of the latent variable generating network to generate corresponding QA pairs. Referring to FIG. 8, it can be seen that whenever a latent variable change to another latent variable, the corresponding QA pair is meaningful and diverse.

Unsupervised QA

The unsupervised setting is used to identify whether the performance of the QA model has been improved based on the user-labeled QA pairs and the generated QA pairs. Since synthetic datasets consisting of generated QA pairs may inevitably contain some noise, it is possible to refine the QA pairs by using heuristic to replace the generated answers whose F1 score to the prediction of the QA model trained on the human-labeled data is lower than a set threshold.

The experiment was performed by selecting a threshold of 40.0 for the QA pair refinement model via cross-validation on the SQuAD dataset.

SQuAD

First, unsupervised QA experiments are performed on SQuAD using the synthetic QA pairs generated from the model. For the contexts, both the paragraphs in the original SQuAD (S) dataset and the new paragraphs in the HarvestingQA(H) dataset are used. 10 different QA pairs are generated by sampling from the latent network (S×10) using Info-HCVAE. In the case of the reference model, a Semantic-QG with a beam search size of 10 is used to obtain the same number of QA pairs, and one latent variable per context is sampled using different portions of the paragraphs of HarvestingQA (Hx10%-Hx100%) to generate new QA pairs. FIG. 9 shows that the framework of the HCVAE of the present invention significantly outperforms Semantic-QG by improving the accuracy of the BERT-base model by 2.12 (EM) and 1.59 (F1).

NQ/Trivia QA

The HCVAE of the present invention is most useful when there is no labeled data for a target dataset. To show how well the QAG model is performed in such an environment, the QA model is trained using QA pairs generated by a model trained on SQuAD and tested on the target datasets (NQ and TriviaQA). Multiple QA pairs are generated from each context of the target dataset and sampled one to ten times (N1-10, T1-10) in the latency space. Thereafter, the QA model pre-trained on the SQuAD dataset is fine-tuned using the generated QA pairs. FIG. 10 shows that as training data increases with a larger number of synthetic QA pairs, the performance of the QA model increases significantly, greatly exceeding the QA model trained with only the SQuAD dataset. In addition, it can be seen that a model trained with QAG is significantly inferior to a model trained with a human-labeled dataset because distribution between sources and target datasets is inconsistent.

According to the present invention as described above, it is possible to generate diverse QA pairs from a single context using a new probabilistic deep model, and also, to strengthen the consistency between the generated QA pairs effectively by maximizing mutual information of questions and answers.

The embodiments of the present invention disclosed in the present specification and drawings are provided only to provide specific examples to easily explain the technical content of the present invention and to aid understanding of the present invention, and are not intended to limit the scope of the present invention. It is obvious to those of ordinary skill in the art that other modified examples based on the technical idea of the present invention can be implemented in addition to the embodiments disclosed herein.

While the present invention has been described with respect to the specific embodiments, it will be apparent to those skilled in the art that various changes and modifications may be made without departing from the spirit and scope of the invention as defined in the following claims.

What is claimed is:

1. A context-based QA generating device, comprising:
    a latent variable generating network configured to generate a second question latent variable and a second answer latent variable by applying a second context to artificial neural network trained using a first context, a first question, and a first answer;
    an answer generating network configured to generate a second answer by decoding the second answer latent variable; and
    a question generating network configured to generate a second question based on the second context and the second answer;
    wherein the second question and the second answer are characterized by a high mutual information to strengthen a consistency; and
    wherein the second answer latent variable is forced to be dependent on the second question latent variable.

2. The context-based QA generating device of claim 1, wherein the latent variable generating network comprising:
    multiple Bi-LSTM encoders encode the first context, the first question and the first answer to generate a first context vector, a first question vector and a first answer vector, respectively,
    a first Multi-Layer Perceptron (MLP) generate a first question latent variable based on the first context vector and the first question vector, and
    a second MLP generate a first answer latent variable based on the first question latent variable and the first answer vector.

3. The context-based QA generating device of claim 2, wherein the context-based QA generating device trains the artificial neural network based on the first context, the first question latent variable, and the first answer latent variable.

4. The context-based QA generating device of claim 2, wherein the first question latent variable and the first answer latent variable include constraints according to distribution.

5. The context-based QA generating device of claim 1, wherein the answer generating network is configured to generate a second answer by predicting a start and end points of a correct answer span based on context information of the second context and the second answer latent variable.

6. The context-based QA generating device of claim 1, wherein the question generating network is configured to generate a third context vector and a third answer vector by further encoding the second context and the second answer, and generate a second question based on the third context vector and the third answer vector.

7. The context-based QA generating device of claim 6, wherein an attention mechanism is used to minimize loss occurring in decoding of the third context vector and the third answer vector.

8. The context-based QA generating device of claim 1, wherein the context-based QA generating device comprises a hierarchical conditional variational autoencoder.

9. The context-based QA generating device of claim 8, wherein the hierarchical conditional variational autoencoder is configured to provide a neural estimation value to maximize the mutual information between the second question and the second answer.

10. The context-based QA generating device of claim 8, wherein the hierarchical conditional variational autoencoder is configured to separate the answer generating network and the question generating network to allow for unlimited questions being generated from a single context.

11. The context-based QA generating device of claim 1, a reverse dependency is obtained by sampling the second question.

12. The context-based QA generating device of claim 1, wherein the second context is received from a user, the second context comprises m tokens, and the second question comprises n tokens based on the second context, and the second answer comprises 1 token based on the second context.

13. The context-based QA generating device of claim 1, wherein the mutual information is data obtained by quantifying how dependent the second question and the second answer are.

14. The context-based QA generating method, comprising:
    by a latent variable generating network, generating a second question latent variable and a second answer latent variable by applying a second context to artificial neural network trained using a first context, a first question, and a first answer;
    by an answer generating network, generating a second answer by decoding the second answer latent variable; and
    a question generating network, generating a second question based on the second context and the second answer;
    wherein the second question and the second answer are characterized by a high mutual information to strengthen a consistency; and
    wherein the second answer latent variable is enforced to be dependent on the second question latent variable.

15. A non-transitory computer readable storage medium storing a program comprising instructions to execute the method of claim 14.

* * * * *